US012738227B2

(12) United States Patent
Seo et al.

(10) Patent No.: US 12,738,227 B2
(45) Date of Patent: Sep. 15, 2026

(54) TRANSPARENT DISPLAY DEVICE REDUCING NUMBER OF PIXEL DRIVING LINES

(71) Applicant: LG Display Co., Ltd., Seoul (KR)

(72) Inventors: Daeyoung Seo, Seoul (KR); ByungHyun Lee, Paju-si (KR); TaeYong Kim, Anyang-si (KR); Sumin Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/246,675

(22) Filed: Jun. 23, 2025

(65) Prior Publication Data

US 2026/0087994 A1 Mar. 26, 2026

(30) Foreign Application Priority Data

Sep. 25, 2024 (KR) ........................ 10-2024-0130020

(51) Int. Cl.
*G09G 3/3241* (2016.01)

(52) U.S. Cl.
CPC ... *G09G 3/3241* (2013.01); *G09G 2300/0842* (2013.01); *G09G 2310/08* (2013.01); *G09G 2320/0233* (2013.01); *G09G 2320/0242* (2013.01); *G09G 2320/029* (2013.01); *G09G 2320/045* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291
USPC ...................................................... 345/76–83
See application file for complete search history.

(56) References Cited

U.S. PATENT DOCUMENTS

| | | | | |
|---|---|---|---|---|
| 12,512,060 B2 * | 12/2025 | Seo | G09G 3/3233 | |
| 2003/0197666 A1 * | 10/2003 | Akimoto | G09G 3/3233 | 345/82 |
| 2010/0156875 A1 * | 6/2010 | Kim | G09G 3/3233 | 345/80 |
| 2010/0321422 A1 * | 12/2010 | Ishiguro | G09G 3/3233 | 345/82 |
| 2012/0307174 A1 * | 12/2012 | Lee | G09G 3/3614 | 349/54 |

(Continued)

FOREIGN PATENT DOCUMENTS

KR 10-0600867 B1 7/2006

*Primary Examiner* — Ke Xiao
*Assistant Examiner* — Nelson Lam
(74) *Attorney, Agent, or Firm* — Fenwick & West LLP

(57) ABSTRACT

A display device may include a unit pixel group including a plurality of pixels, a data driver which supplies a data signal to the unit pixel group through a data line, a gate driver which supplies first to third scan signals to the unit pixel group through first to third gate lines, and a power supply unit which supplies first to third power voltages to the unit pixel group through first to third power lines. The first power line includes a first sub power line to which a first sub power voltage is supplied, a second sub power line to which a second sub power voltage is supplied, and a third sub power line to which a third sub power voltage is supplied and the power supply unit supply the first to third sub power voltages to the first to third sub power lines in a time division manner.

18 Claims, 8 Drawing Sheets

(56) References Cited

U.S. PATENT DOCUMENTS

| | | | | |
|---|---|---|---|---|
| 2014/0009456 | A1* | 1/2014 | Kim | G09G 3/3208 345/82 |
| 2016/0117979 | A1* | 4/2016 | An | G09G 3/3208 345/76 |

* cited by examiner

TRANSPARENT DISPLAY DEVICE REDUCING NUMBER OF PIXEL DRIVING LINES

CROSS-REFERENCE TO RELATED APPLICATION

This application claims the priority of Republic of Korea Patent Application No. 10-2024-0130020 filed on Sep. 25, 2024, which is hereby incorporated by reference in its entirety.

BACKGROUND

Field

The present disclosure relates to a display device, and more particularly, to a transparent display device.

Description of the Related Art

As it enters an information era, a display field which visually expresses electrical information signals has been rapidly developed, and in response to this, various display devices having excellent performances such as thin-thickness, light weight, and low power consumption have been developed. Examples of such a display device include a liquid crystal display device (LCD) and an organic light emitting display device (OLED).

Recently, a transparent display device which allows a user (a viewer) to see an object or a background located on a rear surface of the display device is being actively studied. The transparent display device is divided into a light transmitting unit which transmits light as it is and a light emitting unit which emits light. A user sees objects or backgrounds located on the rear surface of the transparent display device through the light transmitting unit.

SUMMARY

An object to be achieved by the present disclosure is to provide a display device in which the number of lines for driving pixels is minimized or reduced.

Another object to be achieved by the present disclosure is to provide a display device with an improved light transmittance.

Still another object to be achieved by the present disclosure is to provide a display device with a reduced manufacturing cost.

Objects of the present disclosure are not limited to the above-mentioned objects, and other objects, which are not mentioned above, can be clearly understood by those skilled in the art from the following descriptions.

In order to achieve the objects as described above, according to an embodiment of the present disclosure, a display device include a unit pixel group including a plurality of pixels, a data driver which supplies a data signal to the unit pixel group through a data line, a gate driver which supplies first to third scan signals to the unit pixel group through first to third gate lines, and a power supply unit which supplies first to third power voltages to the unit pixel group through first to third power lines. The first power line includes a first sub power line to which a first sub power voltage is supplied, a second sub power line to which a second sub power voltage is supplied, and a third sub power line to which a third sub power voltage is supplied and the power supply unit supply the first to third sub power voltages to the first to third sub power lines in a time division manner.

In order to achieve the objects as described above, another embodiment of the present disclosure, a display device include a unit pixel group including a plurality of pixels, a data driver which supplies a data signal to the unit pixel group through a data line, a gate driver which supplies first to third scan signals to the unit pixel group through first to third gate lines, and a power supply unit which supplies first to third power voltages to the unit pixel group through first to third power lines. The unit pixel group include first to third pixels which are sequentially disposed on a first column parallel to a first direction along the first direction, fourth to sixth pixels which are sequentially disposed on a second column adjacent to the first column in a second direction which is different from the first direction, along the first direction, and seventh to ninth pixels which are sequentially disposed on a third column adjacent to the second column in the second direction, along the first direction. One frame include a first sub frame in which the first to third pixels emit light, a second sub frame in which the fourth to sixth pixels emit light, and a third sub frame in which the seventh to ninth pixels emit light.

Other detailed matters of the exemplary embodiments are included in the detailed description and the drawings.

Accordingly, in the case of the display device according to the exemplary embodiments of the present disclosure, the light transmittance can be improved and the manufacturing cost of the display device can be saved.

Further, in the case of the display device according to the exemplary embodiments of the present disclosure, in each sub frame included in one frame, light emitting diodes with different colors sequentially emit light so that the display device can display an image without causing color break-up of the image.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
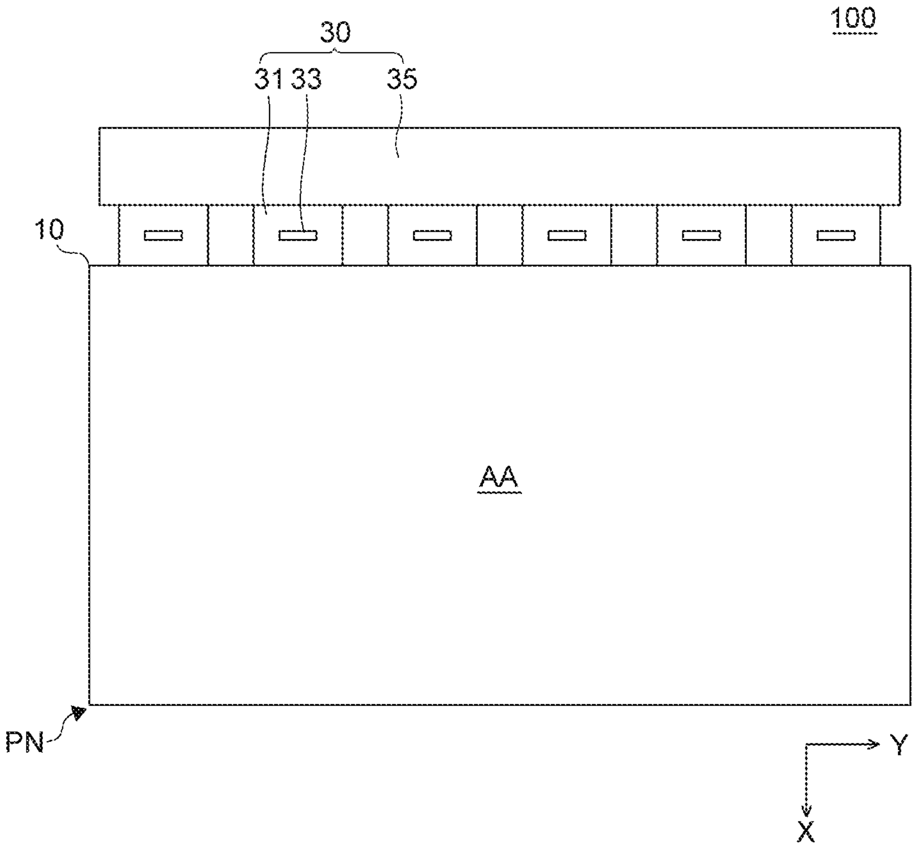
FIG. 1 is a view illustrating a display device according to exemplary embodiments of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “comprising” used herein are generally intended to allow other components to be added unless the terms are used with the term “only”. Any references to singular may include plural unless expressly stated otherwise.

Components are interpreted to include an ordinary error range even if not expressly stated.

When the position relation between two parts is described using the terms such as “on”, “above”, “below”, and “next”, one or more parts may be positioned between the two parts unless the terms are used with the term “immediately” or “directly”.

When explaining temporal relationships, terms such as “after,” “following,” “subsequent to,” or “before,” etc., may include non-consecutive cases unless terms like “immediately” or “directly” are used.

Terms such as “first,” “second,” etc. are used to describe various components, but these components are not limited by these terms. These terms are merely used to distinguish one component from another. Therefore, a first component mentioned herein could be a second component within the technical scope of the present disclosure.

In describing the components of the present disclosure, terms such as first, second, A, B, (a), or (b) may be used. These terms are only intended to distinguish that one component from other components, and the nature, order, sequence, or number of the respective component is not limited by these terms.

When a component is described as being “connected,” “coupled,” “joined,” or “attached” to another component, it should be understood that the component may be directly connected, coupled, joined, or attached to the other component, but unless explicitly specified otherwise, it may also be indirectly connected, coupled, joined, or attached with another component intervening between each component.

When a component or layer is described as being “in contact with” or “overlapping” another component or layer, the component or layer may directly contact or overlap the other component or layer, but unless explicitly specified otherwise, it should be understood that it may also indirectly contact or overlap with another component intervening between each component.

The term “at least one” should be understood to include all combinations of one or more of the associated components. For example, “at least one of first, second, and third components” means not only the first, second, or third component, but also includes all combinations of two or more components from among the first, second, and third components.

The terms “first direction”, “second direction”, “third direction”, “X-axis direction”, “Y-axis direction”, and “Z-axis direction” should not be interpreted solely as geometric relationships perpendicular to each other, but may indicate broader directionality within the range where the configuration of the present disclosure can function.

The features of various embodiments in the present disclosure may be partially or wholly combined or associated with each other, various technical interlocking and operations are possible, and each embodiment may be implemented independently of each other or may be implemented together in an associated relationship.

Hereinafter, a display apparatus according to exemplary embodiments of the present disclosure will be described in detail with reference to accompanying drawings.

FIG. 1 is a view illustrating a display device according to exemplary embodiments of the present disclosure.

Referring to FIG. 1, a display device 100 according to the exemplary embodiments of the present disclosure may include a display panel PN and a driving circuit unit 30.

The display panel PN may include a substrate 10 including a display unit AA and a plurality of pixels (for example, a pixel PX of FIG. 2) disposed on the display unit AA of the substrate 10.

A display area AA is defined as an area where images are displayed and is also defined as an active area. A size of the active area AA may be equal to or substantially equal to a size of the substrate 10 (or the display device 100). For example, the size of the active area AA may be equal to an entire size of the front surface of the substrate 10. By doing this, the substrate 10 may not include an opaque non-active area which is provided along a periphery portion of the front surface so as to enclose the entire active area AA. Accordingly, the entire front surface of the display device 100 may be configured as an active area AA. However, the exemplary embodiment of the present disclosure is not limited thereto and the active area AA is set by a partial area of the front surface of the substrate 10 and the other area may be set as a non-active area.

The display panel PN may display an image through the active area AA (or a front display surface). The active area AA may be parallel to a surface defined by a first directional axis (that is, an axis extending in a first direction X) and a second directional axis (that is, an axis extending in a second direction Y).

In the meantime, for the convenience of description, hereinafter, a first length direction on the plane (for example, a vertical direction of the display panel PN) is illustrated as a first direction X and a second length direction on the plane (for example, a horizontal direction of the display panel PN) is illustrated as a second direction Y. However, the first and second directions X and Y illustrated in the present exemplary embodiment are just illustrative and the first and second directions X and Y are relative concepts to be converted to the other directions. Hereinafter, the first and second directions X and Y denote the same reference numeral.

The active area AA may be provided in various shapes. For example, as illustrated in FIG. 1, the active area AA is a rectangle, for example, a rectangle having one pair of short sides which are parallel to each other along the first direction X and one pair of long sides which are parallel to each other along the second direction Y. However, the exemplary embodiment of the present disclosure is not limited thereto and the active area AA may have various shapes. For example, the active area AA has a rectangular shape as a whole and has a rounded corner in which one longer side and one shorter side are in contact with each other. As another example, the active area AA may have various shapes, such as a square shape, a polygonal shape, or a circular shape.

The driving circuit unit 30 may be configured to display an image corresponding to digital video data supplied from the outside (for example, a display driving system) on the display panel PN.

To be more specific, the driving circuit unit 30 may include a plurality of flexible circuit films 31, a plurality of driving integrated circuits 33, and a printed circuit board 35.

Each of the plurality of flexible circuit films 31 may be attached to each of the plurality of pads and the printed circuit board 35 disposed on the substrate 10 of the display panel PN. The flexible circuit film 31 according to an exemplary embodiment may be a tape carrier package (TCP) or a chip on film (COF), but is not limited thereto.

Each of the plurality of driving integrated circuits 33 may be individually mounted in each of the plurality of flexible circuit films 31. Each of the plurality of driving integrated circuits 33 receives image data and a data control signal which are supplied from the timing controller (for example, a timing controller TD of FIG. 2) disposed on the printed circuit board 35. Further, each of the plurality of driving integrated circuits 33 converts image data into an analog data signal (for example, a data voltage) according to the data control signal to supply the converted data signal to the corresponding pixel (for example, a pixel PX of FIG. 2). For example, each of the plurality of driving integrated circuits 33 generates a plurality of gray-scale voltages using a plurality of reference gamma voltages supplied from the printed circuit board 35. Each of the plurality of driving integrated circuits 33 selectively outputs a gray-scale voltage corresponding to the image data, among the plurality of gray-scale voltages, as a data signal (data voltage) for every pixel, but is not limited thereto.

The printed circuit board 35 may be connected to each of the plurality of flexible circuit films 31. The printed circuit board 35 may serve to transmit a signal and a voltage between configurations of the driving circuit unit 30. For example, the printed circuit board 35 may include a timing controller (for example, a timing controller TD of FIG. 2) and a power supply unit (for example, a power supply unit of FIG. 2).

Figure 2:
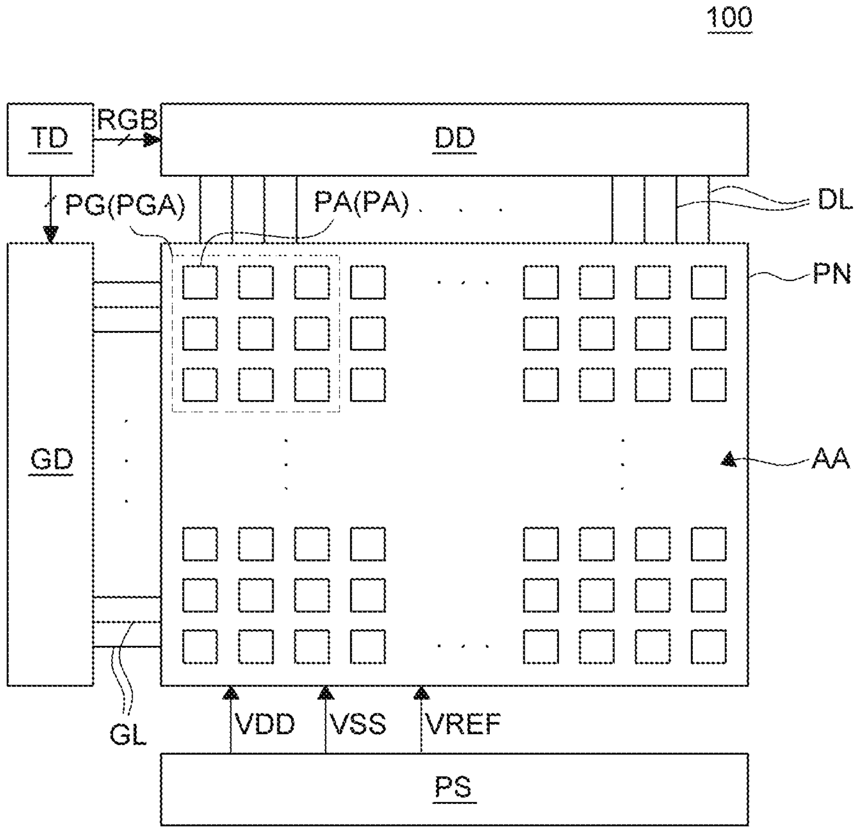
FIG. 2 is a block diagram illustrating a display device according to exemplary embodiments of the present disclosure.

FIG. 2 is a block diagram illustrating a display device according to exemplary embodiments of the present disclosure.

Referring to FIGS. 1 and 2, the display device 100 may include a display panel PN, a gate driver GD, a data driver DD, a timing controller TD, and a power supply unit PS (e.g., a circuit).

The display panel PN may generate images to be provided to the user. For example, as described with reference to FIG. 1, the display panel PN may include the active area AA.

The display panel PN may include a plurality of pixels PX which are disposed in a row direction (for example, the second direction Y) and a column direction (for example, the first direction X) and is disposed on a pixel area PA. For example, the plurality of pixels PX may be disposed in an area where the plurality of data lines DL and the plurality of gate lines GL intersect.

In the meantime, each of the pixel areas PA of each of the plurality of pixels PX may include an emission area in which a light emitting diode is disposed to emit light and a circuit area in which a pixel circuit and a signal line to allow the corresponding pixel PX to emit light. Here, the circuit area may be defined as a light transmission unit. For example, the transparent display device may be implemented by the circuit area which is a light transmission unit so that the user (viewer) may see the object or the background located on the rear surface of the display device 100. For example, the light transmission unit may be an area where light incident to the display panel PN or the active area AA is transmitted as it is. The light transmission unit may be configured to transmit the incident light as it is so as to allow the user (viewer) to see the object or the background located on the rear surface of the display panel PN or the active area AA.

In the meantime, the display device 100 according to the exemplary embodiments of the present disclosure may perform a black image insertion operation in the unit of pixels. For example, the display device 100 may drive the plurality of pixels PX by dividing a first period (or an effective data insertion period) in which an effective data signal for displaying an image is supplied to the pixel PX and a second period (or a black data insertion period) in which a black data signal is supplied to the pixel PX. This will be described in more detail with reference to FIGS. 3 and 4.

In one exemplary embodiment, the plurality of pixels PX may be grouped to a plurality of unit pixel groups PG. For example, at least two or more pixels PX may be included on the unit pixel group area PGA of each unit pixel group PG. For example, as illustrated in FIG. 2, each unit pixel group PG may include nine pixels PX having a 3×3 disposition in a row direction (for example, a second direction Y) and a column direction (for example, a first direction Y), but is just illustrative and the exemplary embodiment of the present disclosure is not limited thereto.

The plurality of pixels PX included in each of the plurality of unit pixel groups PG may emit different color light. For example, at least some of the plurality of pixels PX included in one unit pixel group PG emits red light, the other some emits green light, and the third emits blue light, but is not limited thereto.

The display panel PN may be implemented as a display panel used for various display devices. Hereinafter, it is described that the display panel PN is a panel used for an organic light emitting display device, but is not limited thereto.

The data driver DD, the gate driver GD, and the timing controller TD may provide signals for operations of each pixel PX through signal lines. For example, signal lines for supplying a signal for an operation of each pixel PX may include a plurality of data lines DL and a plurality of gate lines GL.

The plurality of data lines DL are disposed in the column direction (for example, the first direction X) and the plurality of gate lines GL may be disposed in the row direction (for example, the second direction Y).

Each of the plurality of data lines DL is connected to the unit pixel group PG and each of the plurality of gate lines GL is connected to the plurality of pixels included in the plurality of unit pixel groups PG in the unit of pixel rows.

The timing controller TD may control the data driver DD and the gate driver GD. For example, the timing controller TD rearranges digital video data input from the outside in accordance with a resolution of the display panel PN to generate the image data RGB and supply the image data to the data driver DD. Further, the timing controller TD generates timing control signals (for example, a data control signal and a gate control signal) to control the data driver DD and the gate driver GD using a control signal input from the outside to supply the timing control signals to the data driver DD and the gate driver GD.

The data driver DD converts image data input from the timing controller TD based on the data control signal supplied from the timing controller TD into the analog data signal (for example, data voltage) to supply the converted analog data signal to the plurality of data lines DL.

The gate driver GD may generate a scan signal based on the gate control signal supplied from the timing controller TD. For example, the gate driver GD generates a scan signal in a row-sequential manner to drive at least one or more gate lines GL connected to each pixel row to supply the scan signal to the plurality of gate lines GL.

The power supply unit PS may supply a power voltage which is required to drive the pixel PX to the display panel PN.

For example, the power supply unit PS may supply a first power voltage VDD (or a high potential power voltage), a second power voltage VSS (or a low potential power voltage), and a third power voltage VREF (or a reference voltage) to the plurality of pixels PX. In one exemplary embodiment, a voltage level of the second power voltage VSS may be lower than a voltage level of the first power voltage VDD. For example, the first power voltage VDD is a positive voltage and the second power voltage VSS may be a negative voltage.

In the meantime, in order to improve the light transmittance of the display panel PN which includes a light transmission unit, a pixel circuit and a signal line disposed on the pixel area included in each of the plurality of pixels PX needs to be minimized. Accordingly, the display device 100 according to the exemplary embodiments of the present disclosure separates a first power line to supply the first power voltage VDD which is supplied to the plurality of pixels PX included in one unit pixel group PG in the unit of pixel columns. Further, the display device supplies the first power voltage VDD in the unit of pixel columns in a time-division manner to drive the plurality of pixels PX included in the unit pixel group PG. As described above, the first power voltage VDD is supplied to the plurality of pixels PX included in one unit pixel group PG in a time division manner to unify at least some of a signal line and/or a power line connected to the plurality of pixels PX included in one unit pixel group PG. Accordingly, the pixel circuit and the signal line disposed on the pixel area included in each of the plurality of pixels PX may be minimized. Accordingly, in the display device 100 according to the exemplary embodiments of the present disclosure, the light transmittance may be improved and the pixel circuit and the signal line are minimized so that the manufacturing cost of the display device 100 may be reduced. This will be described in more detail with reference to FIG. 5.

Hereinafter, a pixel circuit for driving one pixel PX included in one unit pixel group PG will be described in more detail with reference to FIG. 3 together.

Figure 3:
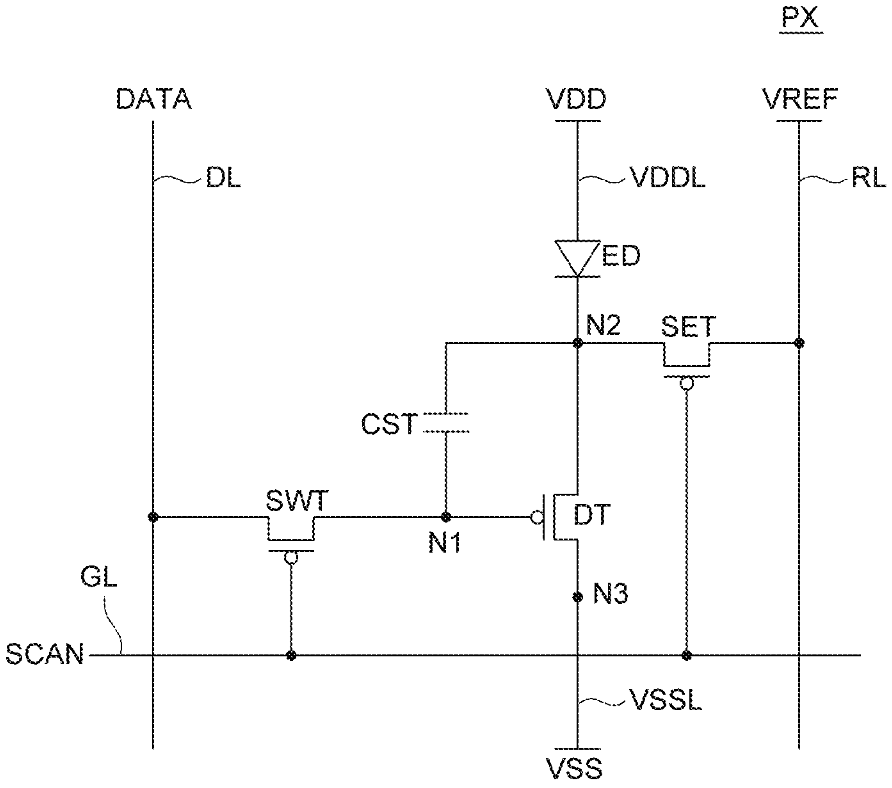
FIG. 3 is a circuit diagram illustrating an example of a pixel included in a display device of FIG. 2 according to exemplary embodiments of the present disclosure.

FIG. 3 is a circuit diagram illustrating an example of a pixel included in a display device of FIG. 2 according to exemplary embodiments of the present disclosure.

Referring to FIG. 3, the pixel PX may include a driving transistor DT, a switching transistor SWT, a sensing transistor SET, a storage capacitor CST, and a light emitting diode ED.

In the meantime, the driving transistor DT, the switching transistor SWT, and the sensing transistor SET included in one pixel PX may be low temperature poly silicon (LTPS) thin film transistors which include an active layer formed of polysilicon. The LTPS thin film transistor has a high electron mobility to have the fast driving characteristic.

However, the exemplary embodiment of the present disclosure is not limited thereto and at least some of the driving transistor DT, the switching transistor SWT, and the sensing transistor SET included in one pixel PX may be an oxide semiconductor thin film transistor which includes an active layer configured by amorphous or crystalline oxide semiconductor. The oxide semiconductor thin film transistor has an excellent off-current characteristic.

The driving transistor DT is connected between a first power line VDDL and a second power line VSSL and may include a gate electrode which is connected to the first node N1. The first power line VDDL supplies a first power voltage VDD (or a high potential power voltage or a pixel driving voltage) and the second power line VSSL which supplies a second power voltage VSS (or a low potential power voltage, a pixel common voltage, or a cathode voltage).

A second node N2 corresponding to the first electrode of the driving transistor DT is connected to the first power line VDDL via the light emitting diode ED and a third node N3 corresponding to the second electrode of the driving transistor DT may be connected to the second power line VSSL.

The driving transistor DT may control a driving current which flows from the first power line VDDL to the second power line VSSL via the light emitting diode ED in response to the data signal DATA supplied through the data line DL. The light emitting diode ED may emit light based on the driving current.

The switching transistor SWT is connected between the data line DL and the first node N1 and may include a gate electrode which is connected to the gate line GL. The switching transistor SWT is turned on when a turn-on level of scan signal SCAN is supplied from the gate line GL to supply the data signal DATA supplied through the data line DL to the first node N1, for example, the gate electrode of the driving transistor DT.

The sensing transistor SET is connected between the third power line RL which supplies a third power voltage VREF (or a reference voltage) and a second node N2 corresponding to the first electrode of the driving transistor DT and may include a gate electrode which is connected to the gate line GL. When the turn-on level of scan signal SCAN is supplied from the gate line GL, the sensing transistor SET is turned on to electrically connect the third power line RL and the second node N2.

In the meantime, in the case of the display device 100, as the driving time of each pixel is increased, the circuit element such as the driving transistor DT may be degraded. Accordingly, a unique characteristic value of the circuit element, such as a driving transistor DT, may be changed. Here, the unique characteristic value of the circuit element may include a threshold voltage Vth of the driving transistor DT or a mobility a of the driving transistor DT. The change in the characteristic value of the circuit element may cause a luminance change of the corresponding pixel PX. Accordingly, the change in the characteristic value of the circuit element may be used as the same concept as the luminance change of the sub pixel PX.

Further, the degree of the change in the characteristic values between circuit elements of each pixel PX may vary depending on a degree of degradation of each circuit element. Such a difference in the changing degree of the characteristic values between the circuit elements may cause a luminance deviation between the pixels PX. Accordingly, the characteristic value deviation between circuit elements may be used as the same concept as the luminance deviation between the pixels PX. The change in the characteristic values of the circuit elements, that is, the luminance change of the pixel PX and the characteristic value deviation between the circuit elements, that is, the luminance deviation between the sub pixels SP may cause problems such as the lowering of the accuracy for luminance expressiveness of the sub pixel SP or screen abnormality.

Therefore, the pixel PX of the display device 100 according to the exemplary embodiment of the present disclosure may provide a sensing function of sensing a characteristic value for the pixel PX and a compensating function of compensating for the characteristic value of the pixel PX using the sensing result. For example, the characteristic value of the pixel PX is sensed through the sensing transistor SET which is turned on during the sensing period and the characteristic value which is sensed for each pixel PX is reflected to compensate for the pixel PX. That is, the sensing transistor SET may be utilized as one of voltage sensing paths for the first electrode of the driving transistor DT.

Therefore, the third power voltage VREF is applied to the second node N2 corresponding to the first electrode of the driving transistor DT through the sensing transistor SET. Further, a voltage for sensing the threshold voltage Vth of the driving transistor DT or the mobility a of the driving transistor DT may be detected by the third voltage line RL. Further, the data driver DD may compensate for the data signal DATA in accordance with a variation of the detected threshold voltage Vth of the driving transistor DT or the detected mobility a of the driving transistor DT.

According to the exemplary embodiment, the switching transistor SWT and the sensing transistor SET of the pixel PX may share one gate line GL. That is, the switching transistor SWT and the sensing transistor SET are connected to the same gate line GL to be applied with the same scan signal SCAN. However, this is just illustrative so that the exemplary embodiment of the present disclosure is not limited thereto. For example, only the switching transistor SWT is connected to the gate line GL which supplies the scan signal SCAN and the sensing transistor SET may be connected to a separate sensing line which supplies a sensing signal.

The storage capacitor CST may be connected between the gate electrode (or the first node N1) of the driving transistor DT and the first electrode (or the second node N2). The storage capacitor CST may store a signal applied to the gate electrode of the driving transistor DT, for example, a data signal DATA.

The light emitting diode ED may include a first electrode, an emission layer, and a second electrode. The first electrode of the light emitting diode ED is connected to the first power line VDDL, for example, as an anode electrode, and the second electrode of the light emitting diode ED may be connected to the second node N2 corresponding to the first electrode of the driving transistor DT, for example, as a cathode electrode.

The emission layer of the light emitting diode ED may include various organic layers, such as a hole injection layer, a hole transport layer, an organic emission layer, an electron transport layer, and an electron injection layer. In the meantime, even though in FIG. 3, it is described that the light emitting diode ED is an organic light emitting diode, the present disclosure is not limited thereto so that as the light emitting diode ED, an inorganic light emitting diode may also be used.

The light emitting diode ED may emit light with a luminance corresponding to a driving current controlled by a pixel circuit, for example, a driving transistor DT.

Figure 4:
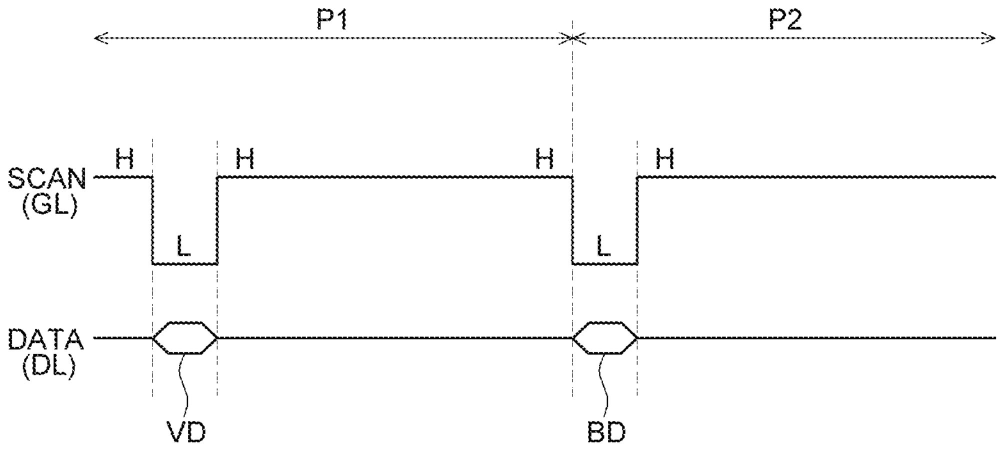
FIG. 4 is a waveform chart for explaining an example of an operation of a pixel of FIG. 3 according to exemplary embodiments of the present disclosure.

FIG. 4 is a waveform chart for explaining an example of an operation of a pixel of FIG. 3 according to exemplary embodiments of the present disclosure.

Referring to FIGS. 3 and 4, one pixel PX may be driven to be divided into a first period P1 (or an effective data insertion period) and a second period P2 (or a black data insertion period).

To be more specifically, a turn-on level (for example, a low level L) of scan signal SCAN is applied to the gate line GL in the first period P1. Further, a data signal DATA corresponding to a specific gray scale value may be applied to the data line DL in a period in which a turn-on level (for example, a low level L) of scan signal SCAN is applied, of the first period P1. For example, an effective data signal VD may be applied to the data line DL.

In this case, the switching transistor SWT is turned on in response to the scan signal SCAN and a data signal DATA, for example, an effective data signal VD, may be supplied to one electrode of the storage capacitor CST, for example, the first node N1 corresponding to the gate electrode of the driving transistor DT. Further, the sensing transistor SET is turned on in response to the scan signal SCAN and the third power voltage VREF applied to the third power line RL may be supplied to the other electrode of the storage capacitor CST, for example, the second node N2 corresponding to the first electrode of the driving transistor DT. Accordingly, a voltage corresponding to the difference between the data signal DATA (for example, an effective data signal VD) and the third power voltage VREF may be stored in the storage capacitor CST.

Further, if the switching transistor SWT and the sensing transistor SET are turned off after the scan signal SCAN supplied to the gate line GL is shifted to a turn-off level (for example, a high level H), a driving current amount which flows through the driving transistor DT is determined in response to the voltage stored in the storage capacitor CST. Further, the light emitting diode ED may emit light with a luminance corresponding to the driving current amount during the first period P1. Accordingly, an effective image to be substantially displayed in the first period P1 may be displayed.

Likewise, a turn-on level (for example, a low level L) of scan signal SCAN may be applied to the gate line GL in the second period P2. Further, a data signal DATA which is applied to the data line may have a black data signal BD corresponding to the black color in a period in which a turn-on level (for example, a low level L) of scan signal SCAN is applied, in the second period P2. Accordingly, the light emitting diode ED may express the black color or does not emit light during the second period P2. When the pixel PX displays moving images, the response time of the pixel PX may be increased due to the sharp change of the data signal DATA. Motion blur is visible to the user due to the increased response time and the black image is inserted between the display images between frames during a short black data insertion period (that is, the second period P2) to improve the motion blur of the moving images.

A length of the first period P1 and a length of the second period P2 may be determined as optimal values by factors, such as an image changing rate or a frequency.

Figure 5:
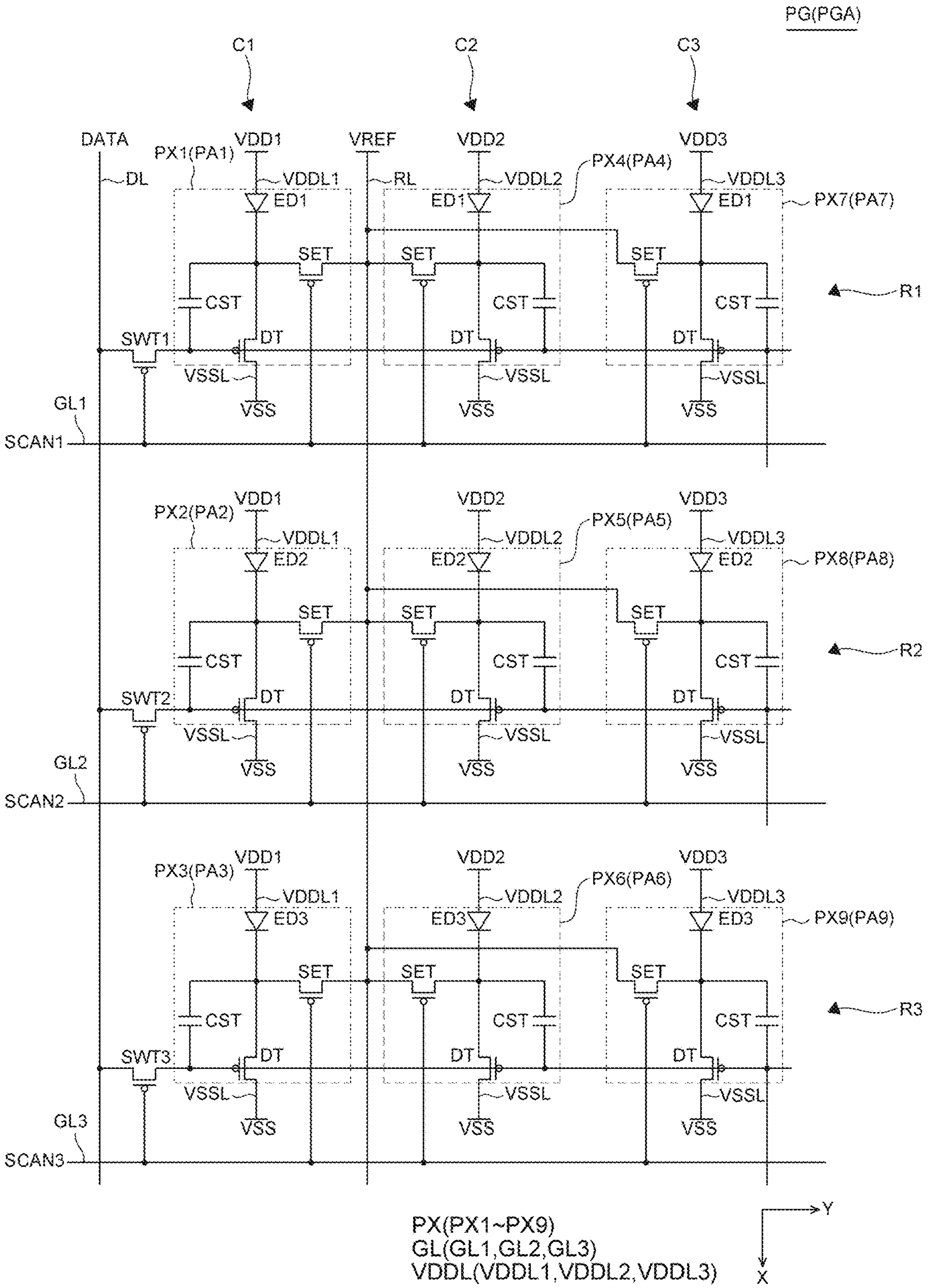
FIG. 5 is a view illustrating an example of a unit pixel group included in a display device of FIG. 2 according to exemplary embodiments of the present disclosure.

FIG. 5 is a view illustrating an example of a unit pixel group included in a display device of FIG. 2 according to exemplary embodiments of the present disclosure.

In the meantime, in FIG. 5, it is illustrated that one unit pixel group PG includes nine pixels PX disposed on three columns C1, C2, and C3 parallel to the first direction X and three rows R1, R2, and R3 parallel to the second direction Y. However, the number of pixels included in one unit pixel group PG is just illustrative for the convenience of description, but is not limited thereto. One unit pixel group PG may include a plurality of pixels PX disposed in various numbers of columns and various numbers of rows. Hereinafter, for the convenience of description, one unit pixel group PG including nine pixels PX which are disposed in a 3×3 arrangement along the column direction (for example, the first direction X) and the row direction (for example, the second direction Y) will be described for reference.

In the meantime, in FIG. 5, one unit pixel group PG including a plurality of pixels PX1 to PX9 and one data line DL, a plurality of gate lines GL, a plurality of first power lines VDDL, a second power line VSSL, and a third power line RL connected to one unit pixel group PG are illustrated.

Referring to FIGS. 1, 3, and 5, one unit pixel group PG may be connected to one data line DL, the plurality of gate lines GL, the plurality of first power lines VDDL, the second power line VSSL, and the third power line RL.

One unit pixel group PG included in one unit pixel group area PGA may include a plurality of pixels PX. For example, one unit pixel group PG may include first to ninth pixels (PX1 to PX9) disposed on each of the first to ninth pixel areas (PA1 to PA9).

In a first column C1, a first pixel PX1, a second pixel PX2, and a third pixel PX3 are sequentially disposed along the first direction X. For example, the first pixel PX1 is disposed on the first pixel area PA1 in which the first row R1 and the first column C1 intersect and the second pixel PX2 is disposed on the second pixel area PA2 in which a second row R2 adjacent to the first row R1 in the first direction X and the first column C1 intersect. The third pixel PX3 may be disposed on the third pixel area PA3 in which a third row R3 adjacent to the second row R2 in the first direction X and the first column C1 intersect.

Further, a fourth pixel PX4, a fifth pixel PX5, and a sixth pixel PX6 may be sequentially disposed in a second column C2 adjacent to the first row C1 in the second direction Y. For example, the fourth pixel PX4 is disposed on a fourth pixel area PA4 in which the first row R1 and the second column C2 intersect and the fifth pixel PX5 is disposed on a fifth pixel area PA5 in which the second row R2 and the second column C2 intersect. The sixth pixel PX6 may be disposed on a sixth pixel area PA6 in which the third row R3 and the second column C2 intersect.

Further, a seventh pixel PX7, an eighth pixel PX8, and a ninth pixel PX9 may be sequentially disposed in a third column C3 adjacent to the second row C2 in the second direction Y, along the first direction X. For example, the seventh pixel PX7 is disposed on a seventh pixel area PA7 in which the first row R1 and the third column C3 intersect and the eighth pixel PX8 is disposed on an eighth pixel area PA8 in which the second row R2 and the third column C3 intersect. The ninth pixel PX9 may be disposed on a ninth pixel area PA9 in which the third row R3 and the third column C3 intersect.

In the exemplary embodiment, pixels included in a plurality of rows R1, R2, and R3, among the plurality of pixels PX1 to PX9 may include light emitting diodes with the same color.

For example, the first, fourth, and seventh pixels PX1, PX4, and PX7 disposed in the first row R1 include a first light emitting diode ED1 having a first color. The second, fifth, and eighth pixels PX2, PX5, and PX8 disposed in the second row R2 include a second light emitting diode ED2 having a second color. The third, sixth, and ninth pixels PX3, PX6, and PX9 disposed in the third row R3 may include a third light emitting diode ED3 having a third color. According to the exemplary embodiment, the first color, the second color, and the third color may be different colors. For example, the first color is red, the second color is green, and the third color is blue, but the exemplary embodiment is not limited thereto.

The data line DL extends along the first direction X and may supply a data signal DATA to the unit pixel group PG. For example, one data line DL may be commonly connected to the plurality of pixels PX1 to PX9 included in one unit pixel group PG.

The plurality of gate lines GL may sequentially supply the scan signal to the plurality of pixels PX1 to PX9 included in the unit pixel group PG in the unit of pixel rows. For example, the plurality of gate lines GL may include first to third gate lines GL1, GL2, and GL3 which sequentially supply the first to third scan signals SCAN1, SCAN2, and SCAN3 to the unit pixel group PG in the unit of pixel rows.

To be more specific, the first to third gate lines GL1, GL2, and GL3 are disposed so as to correspond to the first to third rows R1, R2, and R3 to sequentially supply the first to third scan signals SCAN1, SCAN2, and SCAN3 to the plurality of pixels PX1 to PX9. For example, the first gate line GL1 is commonly connected to the first, fourth, and seventh pixels PX1, PX4, and PX7 disposed in the first row R1 to supply the first scan signal SCAN1. The second gate line GL2 is commonly connected to the second, fifth, and eighth pixels PX2, PX5, and PX8 disposed in the second row R2 to supply the second scan signal SCAN2. The third gate line GL3 is commonly connected to the third, sixth, and ninth PX3, PX6, and PX9 disposed in the third row R3 to supply the third scan signal SCAN3. For example, the first to third scan signals SCAN1, SCAN2, and SCAN3 may be sequentially supplied.

The plurality of first power lines VDDL is connected to the unit pixel group PG to supply the first power voltage VDD to the plurality of pixels PX1 to PX9 included in the unit pixel group.

In one exemplary embodiment, the plurality of first power lines VDDL may include a first sub power line VDDL1 which supplies a first sub power voltage VDD1, a second sub power line VDDL2 which supplies a second sub power voltage VDD2, and a third sub power line VDDL3 which supplies a third sub power voltage VDD3.

To be more specific, the first to third sub power lines VDDL1, VDDL2, and VDDL3 are disposed so as to correspond to the first to third columns C1, C2, and C3 to supply the first to third sub power voltages VDD1, VDD2, and VDD3 to the plurality of pixels PX1 to PX9. For example, the first sub power line VDDL1 is commonly connected to the first to third pixels PX1, PX2, and PX3 disposed in the first column C1 to supply the first sub power voltage VDD1. The second sub power line VDDL2 is commonly connected to the fourth to sixth pixels PX4, PX5, and PX6 disposed in the second column C2 to supply the second sub power voltage VDD2. The third sub power line VDDL3 is commonly connected to the seventh to ninth pixels PX7, PX8, and PX9 disposed in the third column C1 to supply the third sub power voltage VDD3.

In one exemplary embodiment, in one frame 1Frame in which the display device 100 is driven, the first to third sub power voltages VDD1, VDD2, and VDD3 may be supplied in a time division manner through the first to third sub power lines VDDL1, VDDL2, and VDDL3. For example, one frame 1Frame is driven to be divided into a first sub frame, a second sub frame, and a third sub frame. In the first frame, the first sub power voltage VDD1 is supplied through the first sub power line VDDL1, in the second sub frame, the second sub power voltage VDD2 is supplied through the second sub power line VDDL2, and in the third sub frame, the third sub power voltage VDD3 is supplied through the third sub power line VDDL3.

Accordingly, in the first sub frame of one frame 1Frame, the first to third pixels PX1, PX2, and PX3 to which the first sub power voltage VDD1 is supplied emit light and in the second sub frame, the fourth to sixth pixels PX4, PX5, and PX6 to which the second sub power voltage VDD2 is supplied emit light. In the third sub frame, the seventh to ninth pixels PX7, PX8, and PX9 to which the third sub power voltage VDD3 is supplied may emit light. That is, in the first to third sub frames included in one frame 1Frame, pixels (for example, the first to third pixels PX1, PX2, and PX3) disposed in the first column C1, pixels (for example, the fourth to sixth pixels PX4, PX5, and PX6) disposed in the second column C2, and pixels (for example, the seventh to ninth pixels PX7, PX8, and PX9) disposed in the third column C3 may sequentially emit light.

One frame 1Frame including first to third sub frames to drive the first to third sub power lines VDDL1, VDDL2, and VDDL3 in a time division manner will be described in more detail with reference to FIGS. 6 and 7.

The second power line VSSL is commonly connected to the plurality of pixels PX1 to PX9 included in the unit pixel group PG to supply the second power voltage VSS. In the meantime, the second power line VSSL is commonly connected to all the plurality of pixels PX included in the display panel PN to supply the second power voltage VSS, but is not limited thereto.

Further, the third power line RL extends along the first direction X and may supply a third power voltage RL to the unit pixel group PG. For example, one third power line RL may be commonly connected to the plurality of pixels PX1 to PX9 included in one unit pixel group PG.

In one exemplary embodiment, the unit pixel group PG may include a plurality of switching transistors SWT1, SWT2, and SWT3 connected to the plurality of gate lines GL1, GL2, and GL3 disposed in the unit of pixel rows.

For example, the unit pixel group PG may include a first switching transistor SWT1 connected to the first gate line GL1, a second switching transistor SWT2 connected to the second gate line GL2, and a third switching transistor SWT3 connected to the third gate line GL3.

In one exemplary embodiment, the plurality of pixels PX1 to PX9 included in one unit pixel group PG may share one switching transistor in every pixel row.

For example, the first switching transistor SWT1 includes a gate electrode connected to the first gate line GL1 and a first electrode connected to the data line DL and a second electrode of the first switching transistor SWT1 may be commonly connected to the first, fourth, and seventh pixels PX1, PX4, and PX7 disposed in the first row R1. That is, the first, fourth, and seventh pixels PX1, PX4, and PX7 disposed in the first row R1 may share the first switching transistor SWT1. In other words, with regard to the switching transistor SWT included in one pixel PX which has been described with reference to FIG. 3, the switching transistors SWT included in the first, fourth, and seventh pixels PX1, PX4, and PX7 disposed in the first row R1 may be the same. For example, the switching transistor SWT included in each of the first, fourth, and seventh pixels PX1, PX4, and PX7 may be a first switching transistor SWT1 including a gate electrode connected to the first gate line GL1.

Further, the second switching transistor SWT2 includes a gate electrode connected to the second gate line GL2 and a first electrode connected to the data line DL and a second electrode of the second switching transistor SWT2 may be commonly connected to the second, fifth, and eighth pixels PX2, PX5, and PX8 disposed in the second row R2. That is, the second, fifth, and eighth pixels PX2, PX5, and PX8 disposed in the second row R2 may share the second switching transistor SWT2. In other words, with regard to the switching transistor SWT included in one pixel PX which has been described with reference to FIG. 3, the switching transistors SWT included in the second, fifth, and eighth pixels PX2, PX5, and PX8 disposed in the second row R2 may be the same. For example, the switching transistor SWT included in each of the second, fifth, and eighth pixels PX2, PX5, and PX8 may be a second switching transistor SWT2 including a gate electrode connected to the second gate line GL2.

Further, the third switching transistor SWT3 includes a gate electrode connected to the third gate line GL3 and a first electrode connected to the data line DL and a second electrode of the third switching transistor SWT3 may be commonly connected to the third, sixth, and ninth pixels PX3, PX6, and PX9 disposed in the third row R3. That is, the third, sixth, and ninth pixels PX3, PX6, and PX9 disposed in the third row R3 may share the third switching transistor SWT3. In other words, with regard to the switching transistor SWT included in one pixel PX which has been described with reference to FIG. 3, the switching transistors SWT included in the third, sixth, and ninth pixels PX3, PX6, and PX9 disposed in the third row R3 may be the same. For example, the switching transistor SWT included in each of the third, sixth, and ninth pixels PX3, PX6, and PX9 may be a third switching transistor SWT3 including a gate electrode connected to the third gate line GL3.

In the meantime, as described above, the first to third scan signals SCAN1, SCAN2, and SCAN3 may be sequentially supplied in the unit of pixel rows. For example, the first to third scan signals SCAN1, SCAN2, and SCAN3 may be sequentially supplied to the first to third gate lines GL1, GL2, and GL3 in each of the first to third sub frames included in one frame.

Accordingly, the first to third switching transistors SWT1, SWT2, and SWT3 may be sequentially turned on by the first to third scan signals SCAN1, SCAN2, and SCAN3 which are sequentially supplied in the first sub frame. Here, in the first sub frame, the first sub power voltage VDD1 is supplied so that the first to third pixels PX1, PX2, and PX3 disposed in the first column C1 may sequentially emit light. Accordingly, in one unit pixel group PG, the first light emitting diode ED1, the second light emitting diode ED2, and the third light emitting diode ED3 may sequentially emit light in the first sub frame. That is, the first light emitting diode ED1 is included in the first pixel PX1, the second light emitting diode ED2 is included in the second pixel PX2, and the third light emitting diode ED3 is included in the third pixel PX3.

Likewise, the first to third switching transistors SWT1, SWT2, and SWT3 may be sequentially turned on by the first to third scan signals SCAN1, SCAN2, and SCAN3 which are sequentially supplied in the second sub frame. Here, in the second sub frame, the second sub power voltage VDD2 is supplied so that the fourth to sixth pixels PX4, PX5, and PX6 disposed in the second column C2 may sequentially emit light. Accordingly, in one unit pixel group PG, the first light emitting diode ED1, the second light emitting diode ED2, and the third light emitting diode ED3 may sequentially emit light in the second sub frame. That is, the first light emitting diode ED1 is included in the fourth pixel PX4, the second light emitting diode ED2 is included in the fifth pixel PX5, and the third light emitting diode ED3 is included in the sixth pixel PX6.

Likewise, the first to third switching transistors SWT1, SWT2, and SWT3 may be sequentially turned on by the first to third scan signals SCAN1, SCAN2, and SCAN3 which are sequentially supplied in the third sub frame. Here, in the third sub frame, the third sub power voltage VDD3 is supplied so that the seventh to ninth pixels PX7, PX8, and PX9 disposed in the third column C3 may sequentially emit light. Accordingly, in one unit pixel group PG, the first light emitting diode ED1, the second light emitting diode ED2, and the third light emitting diode ED3 may sequentially emit light in the third sub frame. That is, the first light emitting diode ED1 is included in the seventh pixel PX7, the second light emitting diode ED2 is included in the eighth pixel PX8, and the third light emitting diode ED3 is included in the ninth pixel PX9.

As described above, in the unit pixel group PG according to the exemplary embodiments of the present disclosure, light emitting diodes (for example, first to third light emitting diodes ED1, ED2, and ED3) having different colors sequentially emit light in each sub frame. Therefore, the display device 100 may display an image without causing color break-up of the image.

Further, as described above, the plurality of pixels PX1 to PX9 included in one unit pixel group PG share one switching transistor in every pixel row and one data line DL and one third power line RL are commonly connected to the plurality of pixels PX1 to PX9 included in one unit pixel group PG. Accordingly, a pixel circuit, a signal line, and/or a power line on the pixel area included in each of the plurality of pixels PX1 to PX9 may be minimized or at least reduced. Accordingly, in the display device 100 according to the exemplary embodiments of the present disclosure, the light transmittance may be improved and the pixel circuit and the signal line are minimized so that the manufacturing cost of the display device 100 may be reduced.

Hereinafter, an example that one unit pixel group PG is driven in first to third sub frames included in one frame 1Frame will be described in more detail with reference to FIGS. 6 and 7.

Figure 6:
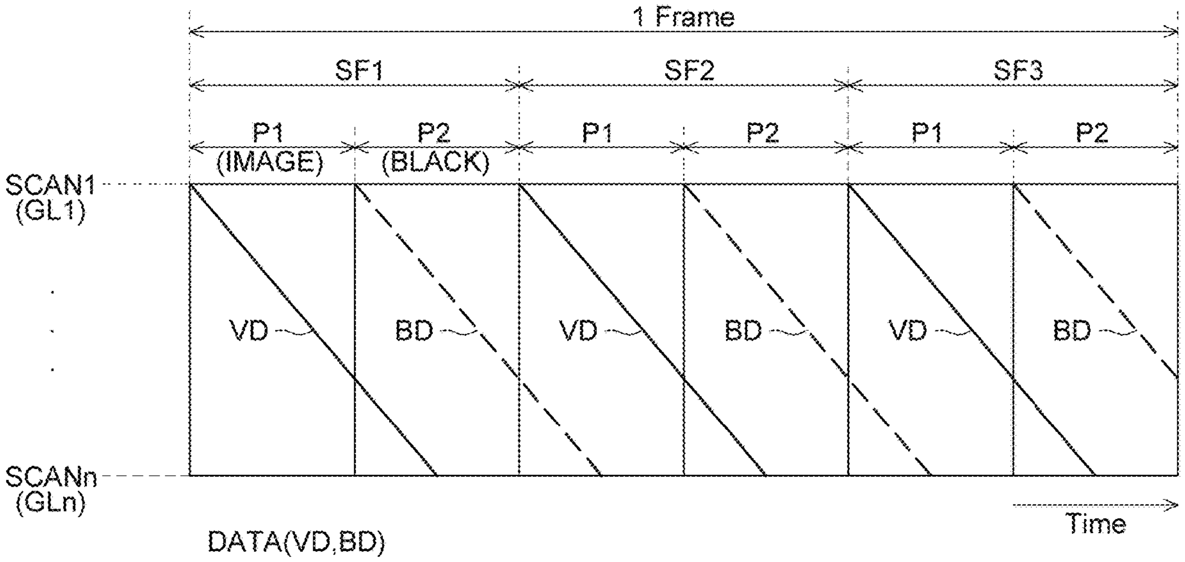
FIG. 6 is a waveform chart for explaining an example of an operation for one frame of a display device according to exemplary embodiments of the present disclosure.

FIG. 6 is a waveform chart for explaining an example of an operation for one frame 1 Frame of a display device according to exemplary embodiments of the present disclosure according to exemplary embodiments of the present disclosure.

Figure 7:
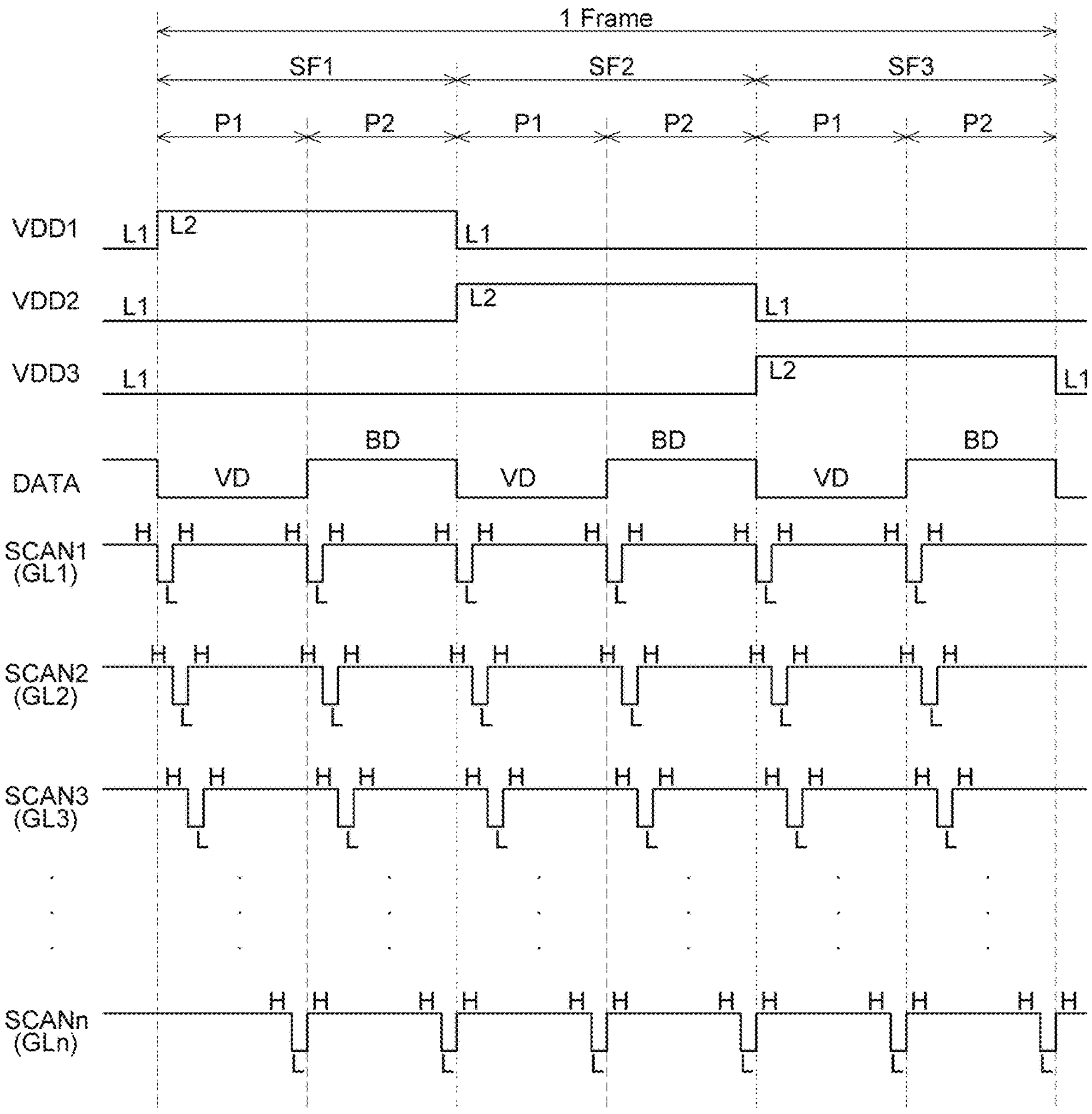
FIG. 7 is a waveform chart for explaining an example of an operation of a unit pixel group of FIG. 5 according to exemplary embodiments of the present disclosure.

FIG. 7 is a waveform chart for explaining an example of an operation of a unit pixel group of FIG. 5 according to exemplary embodiments of the present disclosure.

In the meantime, in FIG. 6, a plurality of scan signals SCAN1 to SCANn supplied to the plurality of gate lines GL1 to GLn according to the time and a data signal DATA supplied to the data line DL are illustrated (n is an integer of 2 or larger).

First, referring to FIGS. 2 to 6, each of the plurality of sub frames SF1, SF2, and SF3 included in one frame 1 Frame for one pixel PX or one pixel row may include a first period P1 (for example, an effective data insertion period) and a second period P2 (for example, a black data insertion period). The first period P1 is a period in which the pixel PX emits light with a luminance corresponding to the effective data signal VD and the second period P2 may be a period in which the pixel PX emits light with black color and low luminance in response to the black data signal BD or does not emit light. Here, the first period P1 and the second period P2 may be different in each pixel PX. In FIG. 6, for the convenience of description, the first period P1 and the second period P2 corresponding to the plurality of pixels PX disposed in a first pixel row, for example, the plurality of pixels PX connected to the first gate line GL1 are illustrated.

In one exemplary embodiment, at a start timing of the first period P1 of each of the sub frames SF1, SF2, and SF3, a turn-on level of first scan signal SCAN1 may be supplied to the plurality of pixels PX connected to the first gate line GL1. Here, the turn-on level corresponds to a voltage level which turns on at least one transistor in the pixel PX, and for example, may be a voltage level which turns on the switching transistor SWT and/or the sensing transistor SET which has been described with reference to FIG. 3. Accordingly, an effective data signal VD is applied to the plurality of pixels PX connected to the first gate line GL1 to emit light with an effective luminance during the first period P1.

Further, as illustrated in FIG. 6, the turn-on level of scan signals SCAN1 to SCANn are sequentially supplied to the plurality of gate lines GL1 to GLn and the plurality of pixels PX connected to the plurality of gate lines GL1 to GLn may sequentially emit light in the unit of pixel rows.

In one exemplary embodiment, at a start timing of the second period P2 of each of the sub frames SF1, SF2, and SF3, a turn-on level of first scan signal SCAN1 may be supplied to the plurality of pixels PX connected to the first gate line GL1. Accordingly, a black data signal BD is applied to the plurality of pixels PX connected to the first gate line GL1 to emit light with a black color and a low luminance in response to the black data signal BD or not to emit light during the second period P2.

As described above, the display device 100 may control a pixel PX to effectively emit light in the first period P1 in each of the sub pixels SF1, SF2, and SF3 included in one frame 1 Frame and the pixel PX so as to emit light in response to the black image or so as not to emit light in the second period P2. That is, the display device 100 may be driven using a black image insertion technique.

The operation of the pixel PX (or the unit pixel group PG) will be described in more detail with reference to FIG. 7 further. In one exemplary embodiment, in the plurality of sub frames SF1, SF2, and SF3 included in one frame 1 Frame, the first to third sub power voltages VDD1, VDD2, and VDD3 are supplied in a time division manner through the first to third sub power lines VDDL1, VDDL2, and VDDL3.

For example, in the first sub frame SF1, a first sub power voltage VDD1 supplied to the first sub power line VDDL1 has a second level L2 and a second sub power voltage VDD2 supplied to the second sub power line VDDL2 and a third sub power voltage VDD3 supplied to the third sub power line VDDL2 may have a first level L1. Here, the first level L1 may have a voltage level lower than the second level L2. For example, the first level L1 is a low level and the second level L2 may be a high level. For example, the second level L2 has a voltage level higher than the second power voltage VSS and the first level L1 has a voltage level which is equal to or lower than the second power voltage VSS, but is not limited thereto.

Further, in each of the first period P1 and the second period P2 of the first sub frame SF1, turn-on level (for example, low level L) of scan signals SCAN1 to SCANn are sequentially supplied to the plurality of gate lines GL1 to GLn. Therefore, the effective data signal VD is applied to the plurality of pixels PX in the unit of pixel rows in the first period P1 and the black data signal BD may be applied to the plurality of pixels PX in the unit of pixel rows in the second period P2.

Here, during the first sub frame SF1, the first sub power voltage VDD1 has a second level L2. Therefore, the first to third pixels PX1 to PX3 connected to the first sub power line VDDL1, among the plurality of pixels PX1 to PX9 included in one unit pixel group PG, emit light with an effective luminance during the first period P1 of the first sub frame SF1 and emit with a black color and a low luminance or does not emit during the second period P2 of the first sub frame SF1.

In contrast, during the first sub frame SF1, the second sub power voltage VDD2 and the third sub power voltage VDD3 have a first level L1. In the fourth to ninth pixels PX4 to PX9 connected to the second sub power line VDDL2 or the third sub power line VDDL3, among the plurality of pixels PX1 to PX9 included in one unit pixel group PG, a current path of a driving current which flows from the first power line VDDL (for example, the second sub power line VDDL2 or the third sub power line VDDL3) to the second power line VSSL in the pixel circuit is not formed. Therefore, the fourth to ninth pixels PX4 to PX9 may not emit light during the first sub frame SF1.

Next, in the second sub frame SF2, a second sub power voltage VDD2 supplied to the second sub power line VDDL2 has a second level L2 and a first sub power voltage VDD1 supplied to the first sub power line VDDL1 and a third sub power voltage VDD3 supplied to the third sub power line VDDL3 have a first level L1.

Further, in each of the first period P1 and the second period P2 of the second sub frame SF2, turn-on level (for example, low level L) of scan signals SCAN1 to SCANn are sequentially supplied to the plurality of gate lines GL1 to GLn. Therefore, the effective data signal VD is applied to the plurality of pixels PX in the unit of pixel rows in the first period P1 and the black data signal BD may be applied to the plurality of pixels PX in the unit of pixel rows in the second period P2.

Here, the second sub power voltage VDD2 has a second level L2 during the second sub frame SF2. Therefore, the fourth to sixth pixels PX4 to PX6 connected to the second sub power line VDDL2, among the plurality of pixels PX1 to PX9 included in one unit pixel group PG, emit light with an effective luminance during the first period P1 of the second sub frame SF2 and emit with a black color or a low luminance or does not emit during the second period P2 of the second sub frame SF2.

In contrast, during the second sub frame SF2, the first sub power voltage VDD1 and the third sub power voltage VDD3 have a first level L1. In the first to third and seventh to ninth pixels PX1 to PX3 and PX7 to PX9 connected to the first sub power line VDDL1 or the third sub power line VDDL3, among the plurality of pixels PX1 to PX9 included in one unit pixel group PG, a current path of a driving current which flows from the first power line VDDL (for example, the first sub power line VDDL1 or the third sub power line VDDL3) to the second power line VSSL in the pixel circuit is not formed. Therefore, the first to third and seventh to ninth pixels PX1 to PX3 and PX7 to PX9 may not emit light during the second sub frame SF2.

Next, in the third sub frame SF3, a third sub power voltage VDD3 supplied to the third sub power line VDDL3 has a second level L2 and a first sub power voltage VDD1 supplied to the first sub power line VDDL1 and a second sub power voltage VDD2 supplied to the second sub power line VDDL2 may have a first level L1.

Further, in each of the first period P1 and the second period P2 of the third sub frame SF3, turn-on level (for example, low level L) of scan signals SCAN1 to SCANn are sequentially supplied to the plurality of gate lines GL1 to GLn. Therefore, the effective data signal VD is applied to the plurality of pixels PX in the unit of pixel rows in the first period P1 and the black data signal BD may be applied to the plurality of pixels PX in the unit of pixel rows in the second period P2.

Here, during the third sub frame SF3, the third sub power voltage VDD3 has a second level L2. Therefore, the seventh to ninth pixels PX7 to PX9 connected to the third sub power line VDDL3, among the plurality of pixels PX1 to PX9 included in one unit pixel group PG, emit light with an effective luminance during the first period P1 of the third sub frame SF3 and emit with a black color or a low luminance or does not emit during the second period P2 of the third sub frame SF3.

In contrast, during the third sub frame SF3, the first sub power voltage VDD1 and the second sub power voltage VDD2 have a first level L1. In the first to sixth pixels PX1 to PX6 connected to the first sub power line VDDL1 or the second sub power line VDDL2, among the plurality of pixels PX1 to PX9 included in one unit pixel group PG, a current path of a driving current which flows from the first power line VDDL (for example, the first sub power line VDDL1 or the second sub power line VDDL2) to the second power line VSSL in the pixel circuit is not formed. Therefore, the first to sixth pixels PX1 to PX6 may not emit light during the third sub frame SF3.

Figure 8:
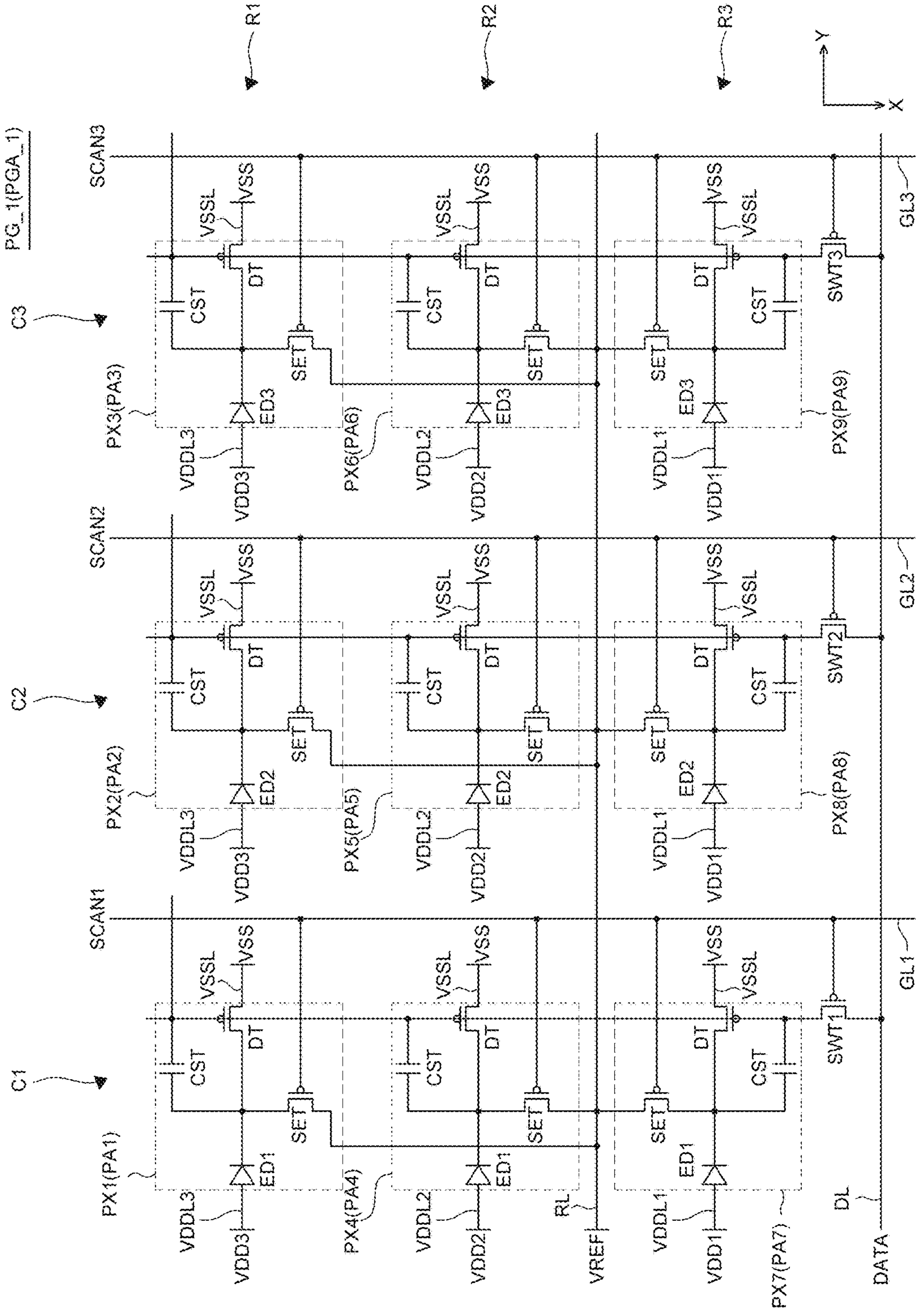
FIG. 8 is a view illustrating another example of a unit pixel group included in a display device of FIG. 2 according to exemplary embodiments of the present disclosure.

FIG. 8 is a view illustrating another example of a unit pixel group included in a display device of FIG. 2 according to exemplary embodiments of the present disclosure.

FIG. 8 corresponds to a modified exemplary embodiment of one unit pixel group PG which has been described with reference to FIG. 5 with regard to the arrangement of the signal line and/or power line connected to the plurality of pixels PX1 to PX9 included in one unit pixel group PG_1. Accordingly, a repeated description with the content which has been described with reference to FIG. 5 will not be repeated.

Referring to FIG. 8, one unit pixel group PG_1 may be connected to one data line DL, the plurality of gate lines GL, the plurality of first power lines VDDL, the second power line VSSL, and the third power line RL.

One unit pixel group PG_1 included in one unit pixel group area PGA_1 may include a plurality of pixels PX. For example, one unit pixel group PG_1 may include first to ninth pixel areas PX1 to PX9 disposed on each of the first to ninth pixel areas PA1 to PA9.

In a first row R1, a first pixel PX1, a second pixel PX2, and a third pixel PX3 are sequentially disposed along the second direction Y. In a second row R2, a fourth pixel PX4, a fifth pixel PX5, and a sixth pixel PX6 are sequentially disposed along the second direction Y. In a third row R3, a seventh pixel PX7, an eighth pixel PX8, and a ninth pixel PX9 may be sequentially disposed along the second direction Y.

In the exemplary embodiment, pixels included in a plurality of columns C1, C2, and C3, among the plurality of pixels PX1 to PX9 may include light emitting diodes with the same color.

For example, the first, fourth, and seventh pixels PX1, PX4, and PX7 disposed in the first column C1 include a first light emitting diode ED1 having a first color. The second, fifth, and eighth pixels PX2, PX5, and PX8 disposed in the second column C2 include a second light emitting diode ED2 having a second color. The third, sixth, and ninth pixels PX3, PX6, and PX9 disposed in the third column C3 may include a third light emitting diode ED3 having a third color. According to the exemplary embodiment, the first color, the second color, and the third color may be different colors. For example, the first color is red, the second color is green, and the third color is blue, but the exemplary embodiment is not limited thereto.

The data line DL extends along the second direction Y and supplies a data signal DATA to the unit pixel group PG_1. For example, one data line DL may be commonly connected to the plurality of pixels PX1 to PX9 included in one unit pixel group PG_1.

The plurality of gate lines GL may sequentially supply the scan signal to the plurality of pixels PX1 to PX9 included in the unit pixel group PG_1 in the unit of pixel columns. For example, the plurality of gate lines GL may include first to third gate lines GL1, GL2, and GL3 which sequentially supply the first to third scan signals SCAN1, SCAN2, and SCAN3 to the unit pixel group PG_1 in the unit of pixel columns.

To be more specific, the first to third gate lines GL1, GL2, and GL3 are disposed so as to correspond to the first to third columns C1, C2, and C3 to sequentially supply the first to third scan signals SCAN1, SCAN2, and SCAN3 to the plurality of pixels PX1 to PX9. For example, the first gate line GL1 is commonly connected to the first, fourth, and seventh pixels PX1, PX4, and PX7 disposed in the first column C1 to supply the first scan signal SCAN1. The second gate line GL2 is commonly connected to the second, fifth, and eighth pixels PX2, PX5, and PX8 disposed in the second column C2 to supply the second scan signal SCAN2. The third gate line GL3 is commonly connected to the third, sixth, and ninth PX3, PX6, and PX9 disposed in the third column C3 to supply the third scan signal SCAN3. For example, the first to third scan signals SCAN1, SCAN2, and SCAN3 may be sequentially supplied.

The plurality of first power lines VDDL is connected to the unit pixel group PG_1 to supply the first power voltage VDD to the plurality of pixels PX1 to PX9 included in the unit pixel group.

In one exemplary embodiment, the plurality of first power lines VDDL may include a first sub power line VDDL1 which supplies a first sub power voltage VDD1, a second sub power line VDDL2 which supplies a second sub power voltage VDD2, and a third sub power line VDDL3 which supplies a third sub power voltage VDD3.

To be more specific, the first to third sub power lines VDDL1, VDDL2, and VDDL3 are disposed so as to correspond to the third row R3, the second row R2, and the first row R1 to supply the first to third sub power voltages VDD1, VDD2, and VDD3 to the plurality of pixels PX1 to PX9. For example, the first sub power line VDDL1 is commonly connected to the seventh to ninth pixels PX7, PX8, and PX9 disposed in the third row R3 to supply the first sub power voltage VDD1. The second sub power line VDDL2 is commonly connected to the fourth to sixth pixels PX4, PX5, and PX6 disposed in the second row R2 to supply the second sub power voltage VDD2. The third sub power line VDDL3 is commonly connected to the first to third pixels PX1, PX2, and PX3 disposed in the first row R1 to supply the third sub power voltage VDD3.

In one exemplary embodiment, in one frame 1 Frame in which the display device 100 is driven, the first to third sub power voltages VDD1, VDD2, and VDD3 may be supplied in a time division manner through the first to third sub power lines VDDL1, VDDL2, and VDDL3. Accordingly, in the first sub frame of one frame 1 Frame, the seventh to ninth pixels PX7, PX8, and PX9 to which the first sub power voltage VDD1 is supplied emit light and in the second sub frame, the fourth to sixth pixels PX4, PX5, and PX6 to which the second sub power voltage VDD2 is supplied emit light. In the third sub frame, the first to third pixels PX1, PX2, and PX3 to which the third sub power voltage VDD3 is supplied may emit light.

Further, the third power line RL extends along the second direction Y and supplies a third power voltage RL to the unit pixel group PG_1. For example, one third power line RL may be commonly connected to the plurality of pixels PX1 to PX9 included in one unit pixel group PG_1.

In one exemplary embodiment, the plurality of pixels PX1 to PX9 included in one unit pixel group PG_1 may share one switching transistor in every pixel column.

For example, the first switching transistor SWT1 includes a gate electrode connected to the first gate line GL1 and a first electrode connected to the data line DL and a second electrode of the first switching transistor SWT1 may be commonly connected to the first, fourth, and seventh pixels PX1, PX4, and PX7 disposed in the first column C1. That is, the first, fourth, and seventh pixels PX1, PX4, and PX7 disposed in the first column C1 may share the first switching transistor SWT1.

Further, the second switching transistor SWT2 includes a gate electrode connected to the second gate line GL2 and a first electrode connected to the data line DL and a second electrode of the second switching transistor SWT1 may be commonly connected to the second, fifth, and eighth pixels PX2, PX5, and PX8 disposed in the second column C2. That is, the second, fifth, and eighth pixels PX2, PX5, and PX8 disposed in the second column C2 may share the second switching transistor SWT2.

Further, the third switching transistor SWT3 includes a gate electrode connected to the third gate line GL3 and a first electrode connected to the data line DL and a second electrode of the third switching transistor SWT3 is commonly connected to the third, sixth, and ninth pixels PX3, PX6, and PX9 disposed in the third column C3. That is, the third, sixth, and ninth pixels PX3, PX6, and PX9 disposed in the third column C3 may share the third switching transistor SWT3.

In the meantime, as described above, the first to third scan signals SCAN1, SCAN2, and SCAN3 may be sequentially supplied in the unit of pixel columns. For example, the first to third scan signals SCAN1, SCAN2, and SCAN3 may be sequentially supplied to the first to third gate lines GL1, GL2, and GL3 in each of the first to third sub frames included in one frame.

Accordingly, the first to third switching transistors SWT1, SWT2, and SWT3 may be sequentially turned on by the first to third scan signals SCAN1, SCAN2, and SCAN3 which are sequentially supplied in the first sub frame. Here, in the first sub frame, the first sub power voltage VDD1 is supplied so that the seventh to ninth pixels PX7, PX8, and PX9 disposed in the third row R3 may sequentially emit light. Accordingly, in one unit pixel group PG_1, the first light emitting diode ED1, the second light emitting diode ED2, and the third light emitting diode ED3 may sequentially emit light in the first sub frame. That is, the first light emitting diode ED1 is included in the seventh pixel PX7, the second light emitting diode ED2 is included in the eighth pixel PX8, and the third light emitting diode ED3 is included in the ninth pixel PX9.

Likewise, the first to third switching transistors SWT1, SWT2, and SWT3 may be sequentially turned on by the first to third scan signals SCAN1, SCAN2, and SCAN3 which are sequentially supplied in the second sub frame. Here, in the second sub frame, the second sub power voltage VDD2 is supplied so that the fourth to sixth pixels PX4, PX5, and PX6 disposed in the second row R2 sequentially emit light. Accordingly, in one unit pixel group PG_1, the first light emitting diode ED1, the second light emitting diode ED2, and the third light emitting diode ED3 sequentially emit light in the second sub frame. That is, the first light emitting diode ED1 is included in the fourth pixel PX4, the second light emitting diode ED2 is included in the fifth pixel PX5, and the third light emitting diode ED3 is included in the sixth pixel PX6.

Likewise, the first to third switching transistors SWT1, SWT2, and SWT3 may be sequentially turned on by the first to third scan signals SCAN1, SCAN2, and SCAN3 which are sequentially supplied in the third sub frame. Here, in the third sub frame, the third sub power voltage VDD3 is supplied so that the first to third pixels PX1, PX2, and PX3 disposed in the first row R1 sequentially emit light. Accordingly, in one unit pixel group PG_1, the first light emitting diode ED1, the second light emitting diode ED2, and the third light emitting diode ED3 sequentially emit light in the third sub frame. That is, the first light emitting diode ED1 is included in the first pixel PX1, the second light emitting diode ED2 is included in the second pixel PX2, and the third light emitting diode ED3 is included in the third pixel PX3.

As described above, in the unit pixel group PG_1 according to the exemplary embodiments of the present disclosure, light emitting diodes (for example, first to third light emitting diodes ED1, ED2, and ED3) having different colors sequentially emit light in each sub frame. Therefore, the display device 100 may display an image without color break-up of the image.

Further, as described above, the plurality of pixels PX1 to PX9 included in one unit pixel group PG_1 share one switching transistor in every pixel column and one data line DL and one third power line RL are commonly connected to the plurality of pixels PX1 to PX9 included in one unit pixel group PG_1. Accordingly, a pixel circuit, a signal line, and/or a power line on the pixel area included in each of the plurality of pixels PX1 to PX9 may be minimized or at least reduced. Accordingly, in the display device 100 according to the exemplary embodiments of the present disclosure, the light transmittance may be improved and the pixel circuit and the signal line are minimized so that the manufacturing cost of the display device 100 may be reduced.

As described above, in the case of the display device according to exemplary embodiments of the present disclosure, a plurality of pixels included in one unit pixel group shares one switching transistor in every pixel row and/or pixel column. Further, one data line and one third power line are commonly connected to the plurality of pixels included in one unit pixel group so that a pixel circuit, a signal line and/or a power line on a circuit area included in each of the plurality of pixels may be minimized.

Accordingly, in the case of the display device according to the exemplary embodiments of the present disclosure, the light transmittance is improved and the manufacturing cost of the display device is saved.

Further, in the case of the display device according to the exemplary embodiments of the present disclosure, in each sub frame included in one frame, light emitting diodes with different colors sequentially emit light so that the display device displays an image without causing color break-up of the image.

The exemplary embodiments of the present disclosure can also be described as follows:

According to an embodiment of the present disclosure, a display device includes a unit pixel group including a plurality of pixels, a data driver which supplies a data signal to the unit pixel group through a data line, a gate driver which supplies first to third scan signals to the unit pixel group through first to third gate lines, and a power supply unit which supplies first to third power voltages to the unit pixel group through first to third power lines. The first power line includes a first sub power line to which a first sub power voltage is supplied, a second sub power line to which a second sub power voltage is supplied, and a third sub power line to which a third sub power voltage is supplied and the power supply unit supply the first to third sub power voltages to the first to third sub power lines in a time division manner.

One frame may include a first sub frame in which the first sub power voltage has a second voltage level and the second and third sub power voltages have a first voltage level which is lower than the second voltage level, a second sub frame in which the second sub power voltage has the second voltage level and the first and third sub power voltages have the first voltage level and a third sub frame in which the third sub power voltage has the second voltage level and the first and second sub power voltages have the first voltage level.

The unit pixel group may include first to third pixels which are sequentially disposed on a first column parallel to a first direction along the first direction, fourth to sixth pixels which are sequentially disposed on a second column adjacent to the first column in a second direction which is different from the first direction, along the first direction and seventh to ninth pixels which are sequentially disposed on a third column adjacent to the second column in the second direction, along the first direction.

Each of the first to third pixels may be connected to the first sub power line, each of the fourth to sixth pixels may be connected to the second sub power line, and each of the seventh to ninth pixels may be connected to the third sub power line.

In the first sub frame, the first to third pixels may emit light, in the second sub frame, the fourth to sixth pixels may emit light, and in the third sub frame, the seventh to ninth pixels may emit light.

The first to ninth pixels may be commonly connected to the data line.

The first, fourth, and seventh pixels may be commonly connected to the first gate line, the second, fifth, and eighth pixels may be commonly connected to the second gate line, and the third, sixth, and ninth pixels may be commonly connected to the third gate line.

The unit pixel group may include a first switching transistor including a gate electrode connected to the first gate line, a first electrode connected to the data line, and a second electrode commonly connected to the first, fourth, and seventh pixels, a second switching transistor including a gate electrode connected to the second gate line, a first electrode connected to the data line, and a second electrode commonly connected to the second, fifth, and eighth pixels and a third switching transistor including a gate electrode connected to the third gate line, a first electrode connected to the data line, and a second electrode commonly connected to the third, sixth, and ninth pixels.

The gate driver may sequentially supply the first to third scan signal to the first to third gate lines in each of the first to third sub frames.

The first, fourth, and seventh pixels may include a light emitting diode with a first color, the second, fifth, and eighth pixels may have a light emitting diode with a second color which is different from the first color, and the third, sixth, and ninth pixels may have a light emitting diode with a third color which is different from the first color and the second color.

Each of the first to ninth pixels may include a light emitting diode, a driving transistor including a first electrode which is connected to the first power line via the light emitting diode and a second electrode connected to the second power line, a switching transistor which is connected between the data line and the gate electrode of the driving transistor and includes a gate electrode connected to any one of the first to third gate lines, a sensing transistor which is connected between the third power line and the first electrode of the driving transistor and includes a gate electrode connected to any one of the first to third gate lines and a storage capacitor connected to the first electrode and the gate electrode of the driving transistor.

According to another aspect of the present disclosure, a display device include a unit pixel group including a plurality of pixels, a data driver which supplies a data signal to the unit pixel group through a data line, a gate driver which supplies first to third scan signals to the unit pixel group through first to third gate lines, and a power supply unit which supplies first to third power voltages to the unit pixel group through first to third power lines. The unit pixel group include first to third pixels which are sequentially disposed on a first column parallel to a first direction along the first direction, fourth to sixth pixels which are sequentially disposed on a second column adjacent to the first column in a second direction which is different from the first direction, along the first direction, and seventh to ninth pixels which are sequentially disposed on a third column adjacent to the second column in the second direction, along the first direction. One frame include a first sub frame in which the first to third pixels emit light, a second sub frame in which the fourth to sixth pixels emit light, and a third sub frame in which the seventh to ninth pixels emit light.

The first power line may include a first sub power line to which a first sub power voltage is supplied, a second sub power line to which a second sub power voltage is supplied, and a third sub power line to which a third sub power voltage is supplied and the power supply unit supplies the first to third sub power voltages to the first to third sub power lines in a time division manner.

In the first sub frame, the first sub power voltage has a second voltage level and the second and third sub power voltages may have a first voltage level which is lower than the second voltage level, in the second sub frame, the second sub power voltage has the second voltage level and the first and third sub power voltages may have the first voltage level, and in the third sub frame, the third sub power voltage has the second voltage level and the first and second sub power voltages may have the first voltage level.

Each of the first to third pixels may be connected to the first sub power line, each of the fourth to sixth pixels may be connected to the second sub power line, and each of the seventh to ninth pixels may be connected to the third sub power line.

The first to ninth pixels may be commonly connected to the data line.

The first, fourth, and seventh pixels may be commonly connected to the first gate line, the second, fifth, and eighth pixels may be commonly connected to the second gate line, and the third, sixth, and ninth pixels may be commonly connected to the third gate line.

The unit pixel group may include a first switching transistor including a gate electrode connected to the first gate line, a first electrode connected to the data line, and a second electrode commonly connected to the first, fourth, and seventh pixels, a second switching transistor including a gate electrode connected to the second gate line, a first electrode connected to the data line, and a second electrode commonly connected to the second, fifth, and eighth pixels and a third switching transistor including a gate electrode connected to the third gate line, a first electrode connected to the data line, and a second electrode commonly connected to the third, sixth, and ninth pixels.

The gate driver may sequentially supply the first to third scan signal to the first to third gate lines in each of the first to third sub frames.

The first, fourth, and seventh pixels may include a light emitting diode with a first color, the second, fifth, and eighth pixels may have a light emitting diode with a second color which is different from the first color, and the third, sixth, and ninth pixels may have a light emitting diode with a third color which is different from the first color and the second color.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. All the technical concepts in the equivalent scope of the present disclosure should be construed as falling within the scope of the present disclosure.

What is claimed is:

1. A display device comprising:

a unit pixel group including a plurality of pixels;

a data driver that supplies a data signal to the unit pixel group through a data line;

a gate driver that supplies a first scan signal to a third scan signal to the unit pixel group through a first gate line to a third gate line; and a power supply unit that supplies a first power voltage to a third power voltage to the unit pixel group through a first power line to a third power line, wherein the first power line includes a first sub power line to which a first sub power voltage is supplied, a second sub power line to which a second sub power voltage is supplied, and a third sub power line to which a third sub power voltage is supplied and the power supply unit supplies the first sub power voltage to the third sub power voltage to the first sub power line to the third sub power line in a time division manner, and wherein one frame includes:

a first sub frame in which the first sub power voltage has a second voltage level and the second sub power voltage and the third sub power voltage have a first voltage level that is less than the second voltage level;

a second sub frame in which the second sub power voltage has the second voltage level and the first sub power voltage and the third sub power voltage have the first voltage level; and a third sub frame in which the third sub power voltage has the second voltage level and the first sub power voltage and the second sub power voltage have the first voltage level.

2. The display device according to claim 1, wherein the unit pixel group includes:

first to third pixels that are sequentially disposed on a first column that is parallel to a first direction along the first direction;

fourth to sixth pixels that are sequentially disposed on a second column that is adjacent to the first column in a second direction that is different from the first direction, along the first direction; and seventh to ninth pixels that are sequentially disposed on a third column that is adjacent to the second column in the second direction, along the first direction.

3. The display device according to claim 2, wherein each of the first pixel to the third pixel is connected to the first sub power line, each of the fourth pixel to the sixth pixel is connected to the second sub power line, and each of the seventh pixel to the ninth pixel is connected to the third sub power line.

4. The display device according to claim 2, wherein in the first sub frame, the first pixel to the third pixel emit light, in the second sub frame, the fourth pixel to the sixth pixel emit light, and in the third sub frame, the seventh pixel to the ninth pixel emit light.

5. The display device according to claim 2, wherein the first pixel to the ninth pixel are commonly connected to the data line.

6. The display device according to claim 2, wherein the first pixel, the fourth pixel, and the seventh pixel are commonly connected to the first gate line, wherein the second pixel, the fifth pixel, and the eighth pixel are commonly connected to the second gate line, and wherein the third pixel, the sixth pixel, and the ninth pixel are commonly connected to the third gate line.

7. The display device according to claim 2, wherein the unit pixel group includes:

a first switching transistor including a gate electrode connected to the first gate line, a first electrode connected to the data line, and a second electrode commonly connected to the first pixel, the fourth pixel, and the seventh pixel;

a second switching transistor including a gate electrode connected to the second gate line, a first electrode connected to the data line, and a second electrode commonly connected to the second pixel, the fifth pixel, and the eighth pixel; and a third switching transistor including a gate electrode connected to the third gate line, a first electrode connected to the data line, and a second electrode commonly connected to the third pixel, the sixth pixel, and the ninth pixel.

8. The display device according to claim 2, wherein the gate driver sequentially supplies the first scan signal to the third scan signal to the first gate line to the third gate line in each of the first sub frame to the third sub frame.

9. The display device according to claim 2, wherein the first pixel, the fourth pixel, and the seventh pixel include a light emitting diode with a first color, wherein the second pixel, the fifth pixel, and the eighth pixel have a light emitting diode with a second color that is different from the first color, and wherein the third pixel, the sixth pixel, and the ninth pixel have a light emitting diode with a third color that is different from the first color and the second color.

10. The display device according to claim 2, wherein each of the first pixel to the ninth pixel includes:

a light emitting diode;

a driving transistor including a first electrode which is connected to the first power line via the light emitting diode and a second electrode connected to the second power line;

a switching transistor that is connected between the data line and a gate electrode of the driving transistor, the switching transistor including a gate electrode connected to any one of the first gate line to the third gate line;

a sensing transistor that is connected between the third power line and the first electrode of the driving transistor, the sensing transistor including a gate electrode connected to any one of the first gate line to the third gate line; and a storage capacitor connected to the first electrode and the gate electrode of the driving transistor.

11. A display device comprising:

a unit pixel group including a plurality of pixels;

a data driver that supplies a data signal to the unit pixel group through a data line;

a gate driver that supplies a first scan signal to a third scan signal to the unit pixel group through a first gate line to a third gate line; and a power supply unit that supplies a first power voltage to a third power voltage to the unit pixel group through a first power line to a third power line, wherein the unit pixel group includes:

a first pixel to a third pixel that are sequentially disposed on a first column parallel to a first direction along the first direction;

a fourth pixel to a sixth pixel that are sequentially disposed on a second column that is adjacent to the first column in a second direction that is different from the first direction, along the first direction;

a seventh pixel to a ninth pixel that are sequentially disposed on a third column that is adjacent to the second column in the second direction, along the first direction;

a first switching transistor including a gate electrode connected to the first gate line, a first electrode connected to the data line, and a second electrode commonly connected to the first pixel, the fourth pixel, and the seventh pixel;

a second switching transistor including a gate electrode connected to the second gate line, a first electrode connected to the data line, and a second electrode commonly connected to the second pixel, the fifth pixel, and the eighth pixel; and a third switching transistor including a gate electrode connected to the third gate line, a first electrode connected to the data line, and a second electrode commonly connected to the third pixel, the sixth pixel, and the ninth pixel, and wherein one frame includes:

a first sub frame in which the first pixel to the third pixel emit light;

a second sub frame in which the fourth pixel to the sixth pixel emit light; and a third sub frame in which the seventh pixel to the ninth pixel emit light.

12. The display device according to claim 11, wherein the first power line includes a first sub power line to which a first sub power voltage is supplied, a second sub power line to which a second sub power voltage is supplied, and a third sub power line to which a third sub power voltage is supplied and the power supply unit supplies the first sub power voltage to the third sub power voltage to the first sub power line to the third sub power line in a time division manner.

13. The display device according to claim 12, wherein in the first sub frame, the first sub power voltage has a second voltage level and the second sub power voltage and the third sub power voltage have a first voltage level that is less than the second voltage level, wherein in the second sub frame, the second sub power voltage has the second voltage level and the first sub power voltage and the third sub power voltage have the first voltage level, and wherein in the third sub frame, the third sub power voltage has the second voltage level and the first sub power voltage and the second sub power voltage have the first voltage level.

14. The display device according to claim 12, wherein each of the first pixel to the third pixel is connected to the first sub power line, each of the fourth pixel to the sixth pixel is connected to the second sub power line, and each of the seventh pixel to the ninth pixel is connected to the third sub power line.

15. The display device according to claim 11, wherein the first pixel to the ninth pixel are commonly connected to the data line.

16. The display device according to claim 11, wherein the first pixel, the fourth pixel, and the seventh pixel are commonly connected to the first gate line, wherein the second pixel, the fifth pixel, and the eighth pixel are commonly connected to the second gate line, and wherein the third pixel, the sixth pixel, and the ninth pixel are commonly connected to the third gate line.

17. The display device according to claim 11, wherein the gate driver sequentially supplies the first scan signal to the third scan signal to the first gate line to the third gate line in each of the first sub frame to the third sub frame.

18. The display device according to claim 11, wherein the first pixel, the fourth pixel, and the seventh pixel include a light emitting diode with a first color, wherein the second pixel, the fifth pixel, and the eighth pixel have a light emitting diode with a second color that is different from the first color, and wherein the third pixel, the sixth pixel, and the ninth pixel have a light emitting diode with a third color that is different from the first color and the second color.

* * * * *